(12) United States Patent
Zhang et al.

(10) Patent No.: US 10,343,683 B2
(45) Date of Patent: Jul. 9, 2019

(54) POWER TRANSMISSION SYSTEM OF VEHICLE AND GEAR-SHIFT CONTROL METHOD FOR THE SAME

(71) Applicant: BYD COMPANY LIMITED, Shenzhen, Guangdong (CN)

(72) Inventors: Jintao Zhang, Shenzhen (CN); Cailin Fu, Shenzhen (CN)

(73) Assignee: BYD COMPANY LIMITED (CN)

( * ) Notice: Subject to any disclaimer, the term of this patent is extended or adjusted under 35 U.S.C. 154(b) by 273 days.

(21) Appl. No.: 15/527,259

(22) PCT Filed: Mar. 17, 2016

(86) PCT No.: PCT/CN2016/076578
§ 371 (c)(1),
(2) Date: May 16, 2017

(87) PCT Pub. No.: WO2016/150330
PCT Pub. Date: Sep. 29, 2016

(65) Prior Publication Data
US 2018/0029596 A1 Feb. 1, 2018

(30) Foreign Application Priority Data
Mar. 25, 2015 (CN) .......................... 2015 1 0133725

(51) Int. Cl.
*B60K 17/354* (2006.01)
*B60W 30/18* (2012.01)
(Continued)

(52) U.S. Cl.
CPC .............. *B60W 30/18* (2013.01); *B60K 1/02* (2013.01); *B60K 7/0007* (2013.01);
(Continued)

(58) Field of Classification Search
None
See application file for complete search history.

(56) References Cited

U.S. PATENT DOCUMENTS

| 7,219,756 B2 * | 5/2007 | Bischoff | B60K 1/02 |
| | | | 180/65.285 |
| 2008/0154472 A1 * | 6/2008 | Okuda | B60K 6/44 |
| | | | 701/93 |

(Continued)

FOREIGN PATENT DOCUMENTS

WO WO-03064200 A1 * 8/2003 ............... B60K 1/02

*Primary Examiner* — Justin Holmes
(74) *Attorney, Agent, or Firm* — Calfee, Halter & Griswold LLP (57) ABSTRACT

A power transmission system of a vehicle and a gear-shift control method are provided. The power transmission system includes a first drive assembly (101) and a second drive assembly (102). The first drive assembly includes a first automatic transmission (2) and a first motor (1) connected with the first automatic transmission (2) for outputting power to two wheels of the vehicle. The second drive assembly (102) includes a second automatic transmission (2000) and a second motor (1000) connected with the second automatic transmission (2000) for outputting power to the other two wheels of the vehicle. The first and second automatic transmission are configured to be shifted to a preset gear or a gear adjacent to the preset gear, such that when one of the first and second automatic transmission is shifted to the preset gear, the other one of the first and second automatic transmission is shifted to the preset gear or the gear adjacent to the preset gear.

20 Claims, 5 Drawing Sheets

(51) Int. Cl.
    *B60K 1/02*           (2006.01)
    *B60K 7/00*           (2006.01)
    *B60K 17/04*          (2006.01)
    *B60K 17/08*          (2006.01)
    *B60K 26/02*          (2006.01)
    *B60W 10/08*         (2006.01)
    *B60W 10/11*         (2012.01)
    *B60W 40/105*       (2012.01)
    *F16H 61/02*          (2006.01)
    *F16H 61/68*          (2006.01)
    *B60K 1/00*           (2006.01)
    *F16H 59/18*          (2006.01)
    *F16H 61/04*          (2006.01)
    *F16H 59/40*          (2006.01)
    *F16H 59/42*          (2006.01)
    *F16H 59/44*          (2006.01)
    *F16H 59/68*          (2006.01)
    *F16H 61/28*          (2006.01)
    *F16H 63/50*          (2006.01)
    *F16H 59/36*          (2006.01)
    *B60K 17/36*         (2006.01)

(52) U.S. Cl.
    CPC ............ *B60K 17/043* (2013.01); *B60K 17/08* (2013.01); *B60K 17/354* (2013.01); *B60K 26/02* (2013.01); *B60W 10/08* (2013.01); *B60W 10/11* (2013.01); *B60W 40/105* (2013.01); *F16H 61/0213* (2013.01); *F16H 61/68* (2013.01); *B60K 17/36* (2013.01); *B60K 2001/001* (2013.01); *B60K 2026/025* (2013.01); *B60W 2510/081* (2013.01); *B60W 2510/104* (2013.01); *B60W 2510/1005* (2013.01); *B60W 2520/10* (2013.01); *B60W 2540/10* (2013.01); *B60W 2710/083* (2013.01); *B60W 2710/1005* (2013.01); *B60Y 2200/1422* (2013.01); *F16H 59/18* (2013.01); *F16H 59/40* (2013.01); *F16H 59/42* (2013.01); *F16H 59/44* (2013.01); *F16H 59/68* (2013.01); *F16H 61/28* (2013.01); *F16H 63/50* (2013.01); *F16H 2059/183* (2013.01); *F16H 2059/366* (2013.01); *F16H 2061/0425* (2013.01); *F16H 2061/0433* (2013.01)

(56) References Cited

U.S. PATENT DOCUMENTS

| | | | |
|---|---|---|---|
| 2008/0236912 A1* | 10/2008 | Ueoka | B60K 6/26 180/65.265 |
| 2011/0179905 A1* | 7/2011 | Tanba | B60K 6/36 74/661 |
| 2012/0143426 A1* | 6/2012 | Yamamoto | B60L 50/61 701/22 |
| 2015/0142280 A1* | 5/2015 | Tamoto | B60W 10/119 701/53 |

* cited by examiner

POWER TRANSMISSION SYSTEM OF VEHICLE AND GEAR-SHIFT CONTROL METHOD FOR THE SAME

CROSS-REFERENCE TO RELATED APPLICATION

This application is a U.S. national phase application of International Application No. PCT/CN2016/076578, filed on Mar. 17, 2016, which is based on and claims priority to and benefits of Chinese Patent Application No. 201510133725.2, filed with the State Intellectual Property Office (SIPO) of the People's Republic of China on Mar. 25, 2015. The entire contents of the above-identified applications are incorporated herein by reference.

FIELD

The present disclosure relates to vehicle technology field, more particularly to a power transmission system of a vehicle and a gear-shift control method for a power transmission system of a vehicle.

BACKGROUND

In the related art, the vehicle, especially the electric vehicle with two drive assemblies, generally has a bad continuity of the power transmission of the drive axles, and takes a long time to increase or reduce speed. Thus, there is a need to improve the power transmission system of the vehicle and the gear-shift control method for the power transmission system.

SUMMARY

Embodiments of the present disclosure seek to solve at least one of the problems existing in the related art to at least some extent.

For this, according to embodiments of a first aspect of the present disclosure, a power transmission system of a vehicle is provided. The system includes a first drive assembly and a second drive assembly. The first drive assembly includes a first motor and a first automatic transmission, and the first motor is connected with the first automatic transmission for outputting power to two wheels of the vehicle. The second drive assembly includes a second motor and a second automatic transmission, and the second motor is connected with the second automatic transmission for outputting power to the other two wheels of the vehicle. The first automatic transmission and the second automatic transmission are configured to be shifted to a preset gear or a gear adjacent to the preset gear, such that when one of the first automatic transmission and the second automatic transmission is shifted to the preset gear, the other one of the first automatic transmission and the second automatic transmission is shifted to the preset gear or the gear adjacent to the preset gear.

With the power transmission system of the vehicle according to embodiments of the present disclosure, there is no power interruption during the driving process.

According to embodiments of a second aspect of the present disclosure, a gear-shift control method for a power transmission system of a vehicle is provided. The method includes: causing one of a first automatic transmission of a first drive assembly and a second automatic transmission of a second drive assembly to shift to a preset gear; and causing the other one of the first automatic transmission and the second automatic transmission to shift to the preset gear or the gear adjacent to the preset gear after causing the first automatic transmission or the second automatic transmission to shift to the preset gear.

With the gear-shift control method according to embodiments of the present disclosure, there is no power interruption during the driving process.

According to embodiments of a third aspect of the present disclosure, a vehicle is provided. The vehicle includes the power transmission system mentioned in the above embodiments of the first aspect of the present disclosure.

With the vehicle according to embodiments of the present disclosure, there is no power interruption during the driving process.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Example embodiments will be described in detail herein, and examples thereof are illustrated in accompanying drawings. Throughout figures referred by the following description, the same reference number in different figures indicates the same or similar elements unless otherwise stated. Implementations described in the following exemplary embodiments do not represent all the implementations consistent with the present disclosure. Instead, they are only examples of the device and method consistent with some aspects of the present disclosure detailed in the appended claims.

A power transmission system of a vehicle and a gear-shift control method according to embodiments of the present disclosure will be described with reference to drawings.

Figure 1:
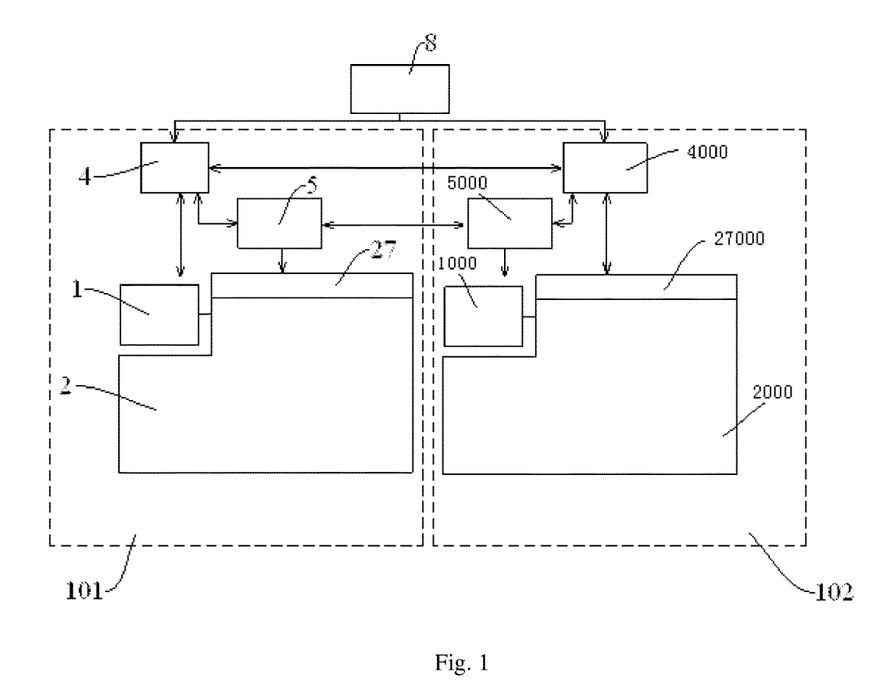
FIG. 1 is a block diagram of a power transmission system of a vehicle according to an embodiment of the present disclosure.

FIG. 1 is a block diagram of a power transmission system of a vehicle according to an embodiment of the present disclosure.

As shown in FIG. 1, the power transmission system 100 according to an embodiment of the present disclosure includes a first drive assembly 101 and a second drive assembly 102. The first drive assembly 101 includes a first motor 1 and a first automatic transmission 2, and the second automatic transmission 102 includes a second motor 1000 and a second automatic transmission 2000. The first motor 1 is connected with the first automatic transmission 2, for outputting power to two wheels of the vehicle. The second motor 1000 is connected with the second automatic transmission 2000, for outputting power to of the other two wheels of the vehicle.

The first automatic transmission 2 and the second automatic transmission 2000 are configured to be shifted to a preset gear or a gear adjacent to the preset gear, such that when one of the first automatic transmission 2 and the second automatic transmission 2000 is shifted to the preset gear, the other one of the first automatic transmission 2 and the second automatic transmission 2000 is shifted to the preset gear or the preset gear adjacent to the preset gear.

Figure 2:
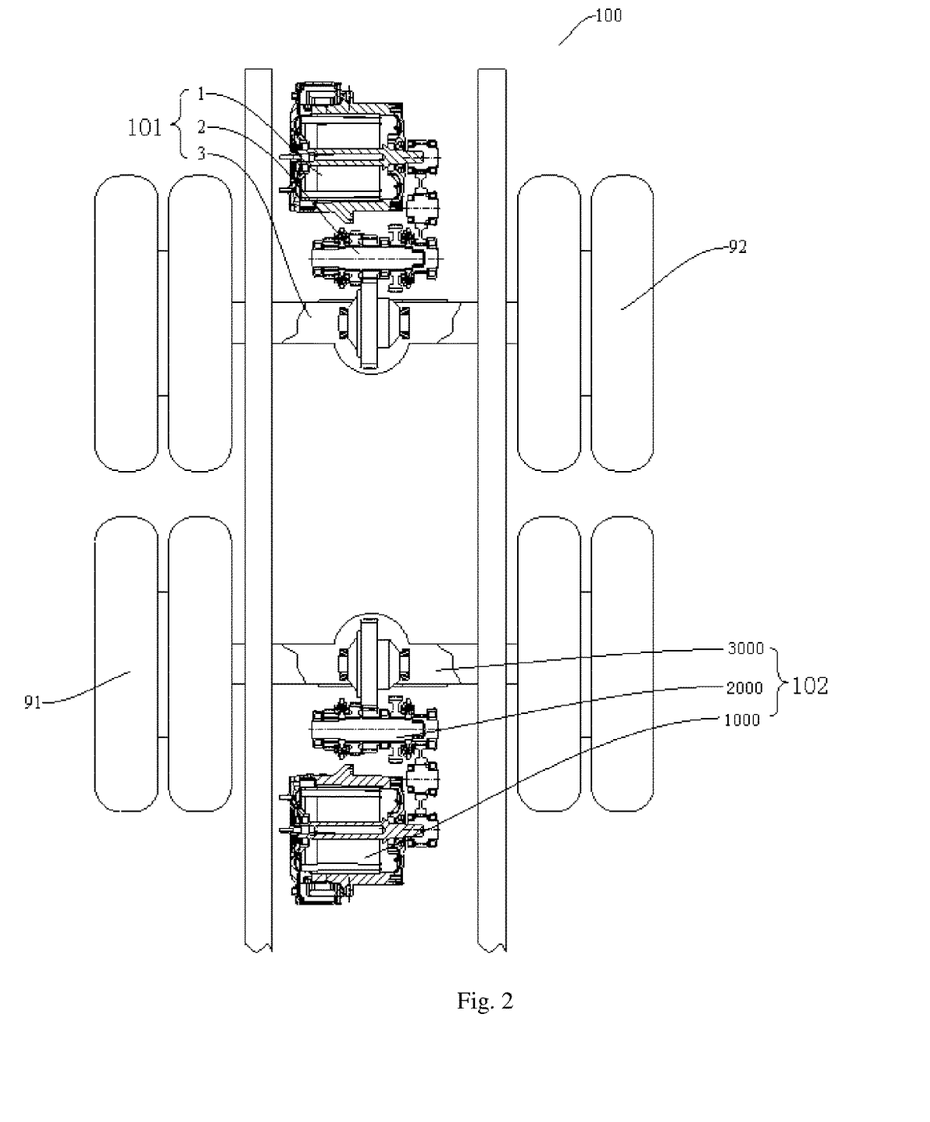
FIG. 2 is a schematic diagram showing a power transmission system of a vehicle according to an embodiment of the present disclosure.

In an embodiment of the present disclosure, each of the first drive assembly 101 and the second drive assembly 102 is a rear drive assembly. As shown in FIG. 2, the first drive assembly 101 is connected with the wheel 92, and the second drive assembly is connected with the wheel 91. Certainly, in other embodiments of the present disclosure, the first drive assembly 101 may be the rear drive assembly of the vehicle, and the second drive assembly 102 may be a front drive assembly of the vehicle.

In an embodiment of the present disclosure, specific structure of the first automatic transmission 2 and the second automatic transmission 2000, as well as the number of gears for the first automatic transmission 2 and the second automatic transmission 2000 may be determined according to actual demands, which should not be limited herein.

It should also be understood that, the preset gear may be any one of gears of the automatic transmission, and the gear adjacent to the preset gear may be a gear higher than the preset gear or a gear lower than the preset gear.

In the following, explanation will be made in an example in which each of the first automatic transmission 2 and the second automatic transmission 2000 has four drive gears.

After the vehicle starts, both the first automatic transmission 2 and the second automatic transmission 2000 are at the first gear. In some embodiments, during the upshift (from the first gear to the second gear), the second automatic transmission 2000 is not shifted from the first gear to the second gear until the first automatic transmission 2 is shifted to the second gear. Similarly, during shifting to the third gear, the second automatic transmission 2000 is not shifted to the third gear until the first automatic transmission 2 is shifted to the third gear. Similarly, during shifting to the fourth gear, the second automatic transmission 2000 is not shifted to the fourth gear until the first automatic transmission 2 is shifted to the fourth gear.

During the downshift from the fourth gear to the third gear, the second automatic transmission 2000 is not shifted to the third gear until the first automatic transmission 2 is shifted to the third gear. Similarly, during shifting to the second gear, the second automatic transmission 2000 is not shifted to the second gear until the first automatic transmission 2 is shifted to the second gear. Similarly, during shifting to the first gear, the second automatic transmission 2000 is not shifted to the first gear until the first automatic transmission 2 is shifted to the first gear.

Certainly, during the upshift or the downshift, the second automatic transmission 2000 may be shifted first, that is, the first automatic transmission 2 is not shifted to the preset gear until the second automatic transmission 2000 is shifted to the preset gear.

In other embodiments of the present disclosure, the power transmission system 100 may realize to skip upshift or to skip downshift. For example, assume that both the first automatic transmission 2 and the second automatic transmission 2000 are at the first gear at present. Then, straight after the first automatic transmission 2 is shifted to the second gear, the second automatic transmission 2000 is shifted to the third gear, and then the first automatic transmission 2 is shifted to the fourth gear from the second gear, and the second automatic transmission 2000 is shifted to the fourth gear from the third gear. Thus, the acceleration process during the driving of the vehicle may be shortened.

When both the first automatic transmission 2 and the second automatic transmission 2000 are at the fourth gear, the second automatic transmission 2000 is shifted to the second gear straight after the first automatic transmission 2 is shifted to the third gear, and then the first automatic transmission 2 is shifted to the first gear from the third gear, and the second automatic transmission 2000 is shifted to the first gear from the second gear. Thus, the deceleration process during the driving of the vehicle may be shortened.

With the power transmission system according to embodiments of the present disclosure, it may realize to alternate shift or to skip shift of the first automatic transmission 2 and the second automatic transmission 2000, thus realizing to drive without power interruption, and shortening the acceleration process and the deceleration process of the vehicle.

As shown in FIG. 1, in an embodiment of the present disclosure, the first drive assembly 101 further includes a first motor controller 4 and a first transmission controller 5, and the second drive assembly 102 further includes a second motor controller 4000 and a second transmission controller 5000.

The first motor controller 4 is connected with the first motor 1, and the first motor controller 4 is also connected with the accelerator pedal sensor 8 of the vehicle, such that the first motor controller 4 may control the speed and the acceleration of the first motor 1 according to the opening of the accelerator pedal sensor 8 and the acceleration of the accelerator pedal.

The second motor controller 4000 is connected with the second motor 1000, and the second motor controller 4000 is also connected with the accelerator pedal sensor 8 of the vehicle, such that the second motor controller 4000 may control the speed and the acceleration of the second motor 1000 according to the opening of the accelerator pedal sensor 8 and the acceleration of the accelerator pedal.

The first transmission controller 5 is connected with the first automatic transmission 2, and the first transmission controller 5 and the first motor controller 4 are communicated with each other, for controlling the gear-shift of the first automatic transmission 2.

The second transmission controller 5000 is connected with the second automatic transmission 2000, and the second transmission controller 5000 and the second motor controller 4000 are communicated with each other, for controlling the gear-shift of the second automatic transmission 2000.

The first motor controller 4 and the second motor controller 4000 may be communicated with each other, the first transmission controller 5 and the second motor controller 4000 may communicate with each other, and the second transmission controller 5000 and first motor controller 4 may be communicated with each other, such that the second transmission controller 5000 may control the second automatic transmission 2000 to shift gears after the first transmission controller 5 controls the first automatic transmission 2 to shift gears, or the first transmission controller 5 may control the first automatic transmission 2 to shift gears after the second transmission controller 5000 controls the second automatic transmission 2000 to shift gears.

As shown in FIGS. 1-4, in an embodiment of the present disclosure, the first drive assembly 101 further includes a first drive axle 3 and a first output speed sensor 6, and the second drive assembly 102 further includes a second drive axle 3000 and a second output speed sensor (not shown).

The first automatic transmission 2 is connected with the wheel 92 via the first drive axle 3. The first output speed sensor 6 is connected with the first drive axle 3, and configured to detect an output speed of the first drive axle 3. In an embodiment, the first drive axle 3 may include a first differential 31, which has a differential driven gear 32 engaged with the output gear 251 of the first automatic transmission 2, and the output speed of the first drive axle 3 may be the output speed of the first differential 31.

The second automatic transmission 2000 is connected with the wheel 91 via the second drive axle 3000. The second output speed sensor is connected with the second drive axle 3000, and configured to detect an output speed of the second drive axle 3000. In an embodiment, the second drive axle 3 may include a second differential (not shown), which has a differential driven gear (not shown) meshed with the output gear of the second automatic transmission 2000, and the output speed of the second drive axle 3000 may be the output speed of the second differential.

In an embodiment of the present disclosure, the first drive assembly 101 further includes a first input speed sensor 7, and the second drive assembly 102 further includes a second input speed sensor (not shown).

The first input speed sensor 7 is connected with an output end of the first motor 1 or an input end of the first automatic transmission 2, and configured to detect a speed of the output end of the first motor 1 or a speed of the input end of the first automatic transmission 2.

The second input speed sensor is connected with an output end of the second motor 1000 or an input end of the second automatic transmission 2000, and configured to detect a speed of the output end of the second motor 1000 or a speed of the input end of the second automatic transmission 2000.

Figure 3:
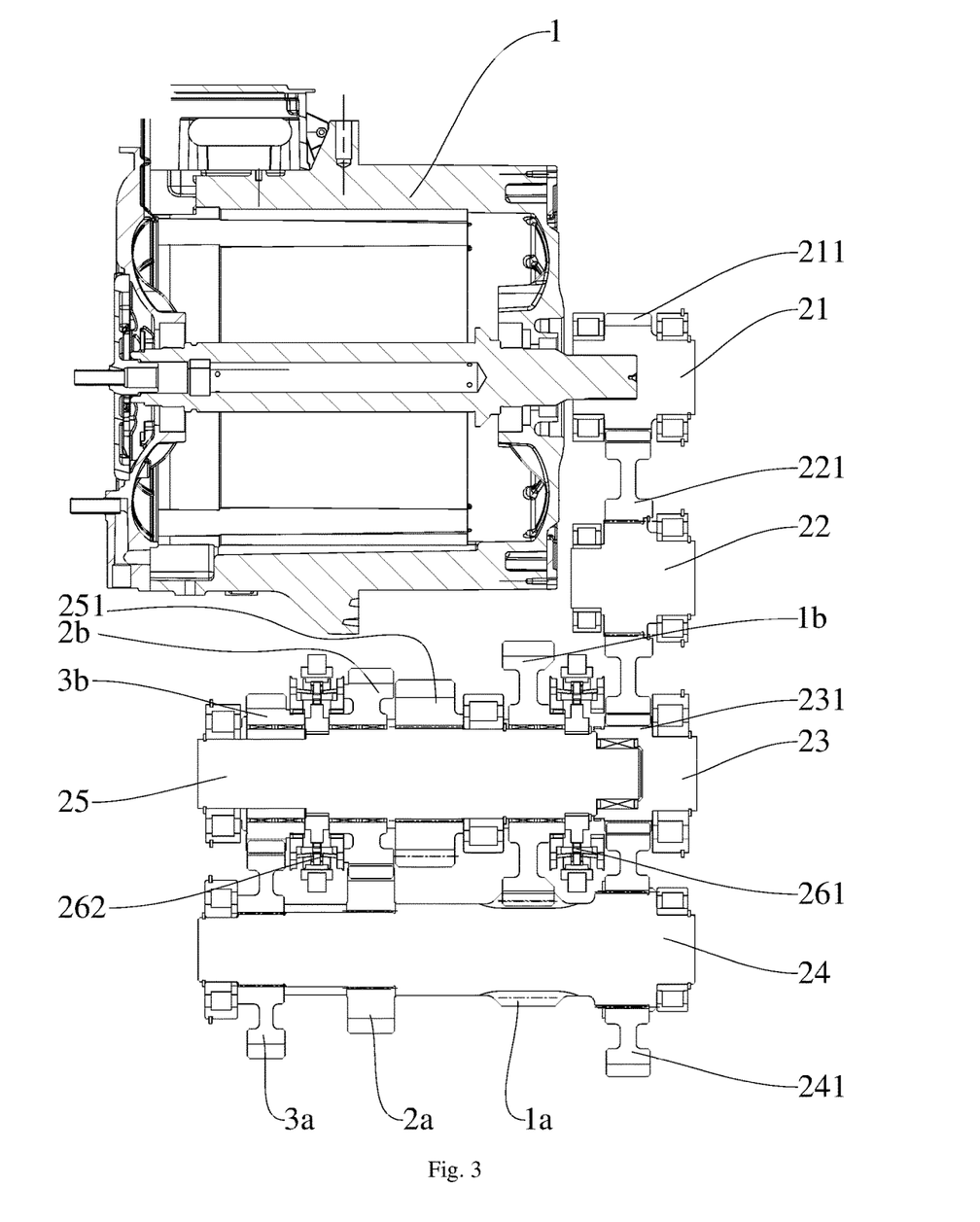
FIG. 3 is a schematic diagram showing a transmission mechanism between a first motor and a first automatic transmission in a power transmission system of a vehicle according to an embodiment of the present disclosure.

As shown in FIG. 3, the first automatic transmission 2 may include a first transfer group, a first shift actuator 27 and a first displacement sensor. The first transfer group may include multiple pairs of meshed gears, the first shift actuator 27 may include a first shift actuating cylinder 278, a first shift fork rod and a first shift fork and a first shift synchronizer. The first displacement sensor is connected with the first transmission controller 5, and the first displacement sensor is also connected with the first shift actuator 27, such that the first transmission controller 5 may control the first shift actuator 27 to move according to the detecting value of the first displacement sensor, for completing the gear-shift.

Specifically, the first transmission controller 5 may send instructions to the first shift actuating cylinder 278, the first actuating cylinder 278 monitors and pushes the first shift fork rod to move according to the detecting value of the first displacement sensor, and the first shift fork rod drives the first shift fork to push the first shift synchronizer for meshing with the corresponding shifting gear or shaft, thus completing the gear-shift.

Similarly, the second automatic transmission 2000 may include a second transfer group, a second shift actuator and a second displacement sensor (not shown). The second transfer group may include multiple pairs of meshed gears, the second shift actuator may include a second shift actuating cylinder, a second shift fork rod and a second shift fork and a second shift synchronizer. The second displacement sensor is connected with the second transmission controller 5, and the second displacement sensor is also connected with the second shift actuator, such that the second transmission controller 5 may control the second shift actuator to move according to the detecting value of the second displacement sensor, for completing the gear-shift.

Specifically, the second transmission controller 5 may send instructions to the second shift actuating cylinder, the second actuating cylinder monitors and pushes the second shift fork rod to move according to the detecting value of the second displacement sensor, and the second shift fork rod drives the second shift fork to push the second shift synchronizer for meshing with the corresponding shifting gear or shaft, thus completing the gear-shift.

A specific example of the present disclosure will be described below with reference to FIGS. 3-4, in which the first drive assembly 101 includes a motor 1, an automatic transmission 2 and a drive axle 3. It should be understood that, the second drive assembly 102 has a same structure as the first drive assembly 101.

As shown in FIG. 3, the motor 1 is connected with the first shaft 21 via splines, and a first shaft gear 211 is fixed on the first shaft 21.

Figure 4:
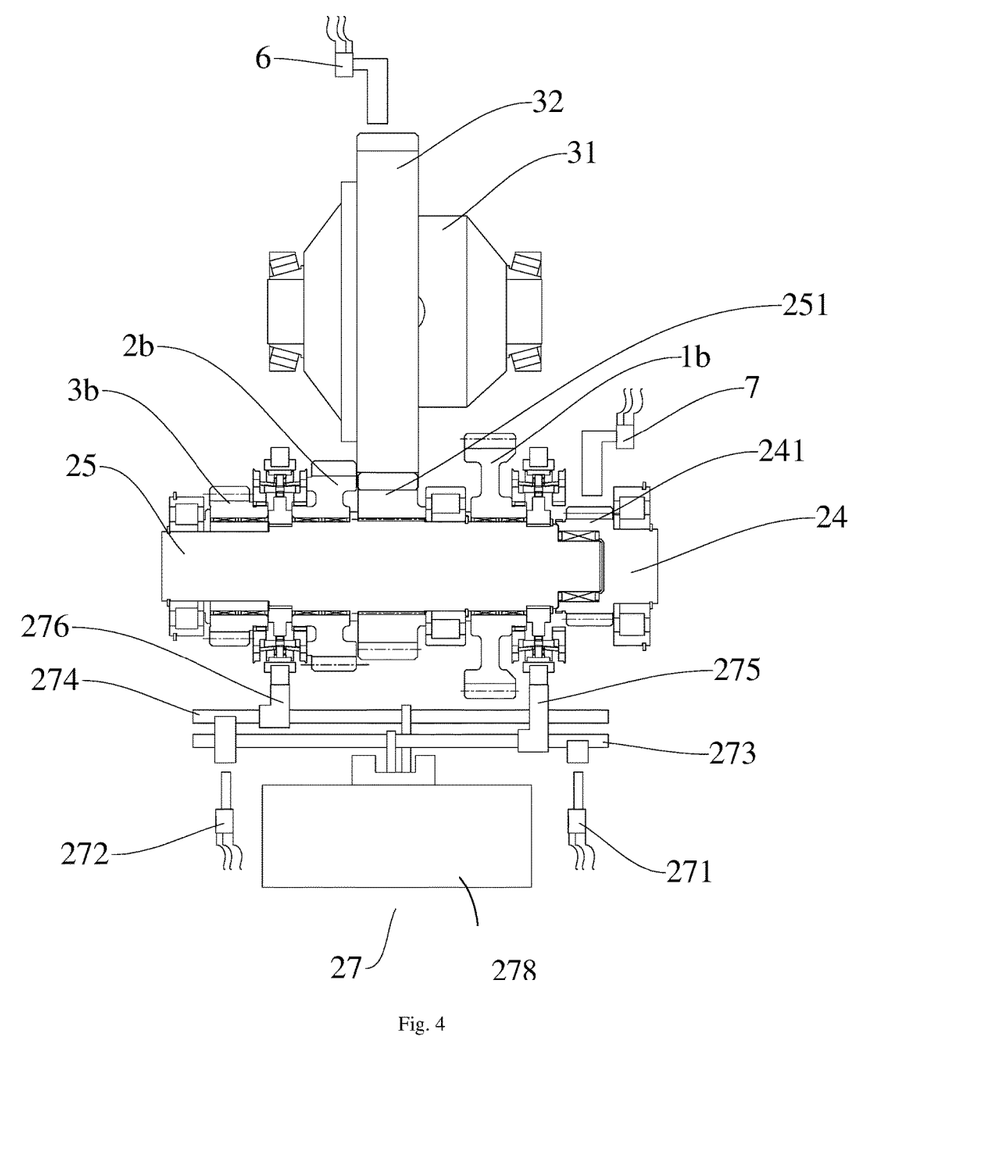
FIG. 4 is a schematic diagram showing a transmission mechanism between a first automatic transmission and a first drive axle in a power transmission system of a vehicle according to an embodiment of the present disclosure.

As shown in FIG. 4, the automatic transmission 2 includes a third shaft 23, a fourth shaft 24 and a fifth shaft 25. A third shaft gear 231 is fixed on the third shaft 23. A transmission is performed between the third shaft gear 231 and the first shaft gear 211 via a second shaft gear 221 fixed on a second shaft 22. A driving gear 1a for the first gear, a driving gear 2a for the second gear, a driving gear 3a for the third gear and a fourth shaft gear 241 meshed with the third shaft gear 231 are fixed on the fourth shaft 24. A driven gear 1b for the first gear meshed with the driving gear 1a, a driven gear 2b for the second gear meshed with the driving gear 2a, and a driven gear 3b for the third gear meshed with the driving gear 3a are fit over the fifth shaft 25.

It should be understood that, the third shaft 23, the fourth shaft 24, the fifth shaft 25 and gears fit over or fixed on them form the transfer group of the automatic transmission 2.

The automatic transmission 2 also includes the shift actuator 27. As shown in FIGS. 3-4, the shift actuator 27 includes a synchronizer 261 for the first and fourth gears, a synchronizer 262 for the second and third gears 262, the shift actuating cylinder 278, a fork rod 273 for the first and fourth gears, a fork rod 274 for the second and third gears, a fork 275 for the first and fourth gears, a fork 276 for the second and third gears, a displacement sensor 271 for the first and fourth gears, and a displacement sensor 272 for the second and third gears.

The synchronizer 261 is configured to engage the driven gear 1b with the fifth shaft 25 or engage the third shaft 23 with the fifth shaft 25. The synchronizer 262 is configured to engage the driven gear 2b with the fifth shaft 25 or engage the driven gear 3b with the fifth shaft 25. The shift actuating cylinder 278 may monitor and control the fork rod 273 to move according to the detecting value of the displacement sensor 271, the fork rod 273 drives the fork 275 to push the synchronizer 261's moving for shifting to the first gear or the fourth gear. The shift actuating cylinder 278 may monitor and control the fork rod 274 to move according to the detecting value of the displacement sensor 272, and the fork rod 274 drives the fork 276 to push the synchronizer 262's moving for shifting to the second gear or the third gear.

In other words, the automatic transmission 2 shown in FIGS. 3-4 is a four-gear automatic transmission 2, and the drive process of which is as follows.

For the first gear, the synchronizer 262 is at a middle position, the synchronizer 261 controls the fork rod 273 via the shift actuating cylinder 278 to push the fork 275 to move leftwards for shifting to the first gear, the first motor 1 is connected with the first shaft 21 via splines, the power output from the motor 1 is transmitted to the second shaft 22 via the meshed first shaft gear 211 and second shaft gear 221, and then transmitted to the third shaft 23 via the meshed second shaft gear 221 and third shaft gear 231, and then transmitted to the fourth shaft 24 via the third shaft gear 231 and the fourth shaft gear 241, and transmitted to the fifth shaft 25 via the meshed driving gear 1a and driven gear 1b, and finally transmitted to the wheel side via the meshed output gear 251 and differential driven gear 32.

For the second gear, the synchronizer 261 is at the middle position, the synchronizer 262 controls the fork rod 274 via the shift actuating cylinder 278 to push the fork 276 to move rightwards for shifting to the second gear, the first motor 1 is connected with the first shaft 21 via splines, the power output from the motor 1 is transmitted to the second shaft 22 via the meshed first shaft gear 211 and second shaft gear 221, and then transmitted to the third shaft 23 via the meshed second shaft gear 221 and third shaft gear 231, and then transmitted to the fourth shaft 24 via the third shaft gear 231 and the fourth shaft gear 241, and transmitted to the fifth shaft 25 via the meshed driving gear 2a and driven gear 2b, and finally transmitted to the wheel side via the meshed output gear 251 and differential driven gear 32.

For the third gear, the synchronizer 261 is at the middle position, the synchronizer 262 controls the fork rod 274 via the shift actuating cylinder 278 to push the fork 276 to move leftwards for shifting to the third gear, the first motor 1 is connected with the first shaft 21 via splines, the power output from the motor 1 is transmitted to the second shaft 22 via the meshed first shaft gear 211 and second shaft gear 221, and then transmitted to the third shaft 23 via the meshed second shaft gear 221 and third shaft gear 231, and then transmitted to the fourth shaft 24 via the third shaft gear 231 and the fourth shaft gear 241, and transmitted to the fifth shaft 25 via the meshed driving gear 3a and driven gear 3b, and finally transmitted to the wheel side via the meshed output gear 251 and differential driven gear 32.

For the fourth gear, the synchronizer 262 is at the middle position, the synchronizer 261 controls the fork rod 273 via the shift actuating cylinder 278 to push the fork 275 to move rightwards for shifting to the fourth gear, the motor 1 is connected with the first shaft 21 via splines, the power output from the first motor 1 is transmitted to the second shaft 22 via the meshed first shaft gear 211 and second shaft gear 221, and then transmitted to the third shaft 23 via the meshed second shaft gear 221 and third shaft gear 231, and then the third shaft 23 is directly meshed with the fifth shaft 25 via the synchronizer 261 for making the third shaft 23 and the fifth shaft 25 rotate coaxially, and finally the power is transmitted to the wheel side via the meshed output gear 251 and differential driven gear 32.

For the neutral gear, both the synchronizer 261 and the synchronizer 262 are at the middle position.

With the above power transmission system 100 having four-gear transmission, the control process is as follows.

Taking the alternate shift of the first drive assembly 101 and the second drive assembly 102 as an example, and referring to FIGS. 2-4, the automatic transmission is shifted to the first gear at starting the vehicle, and the upshift process is as follows.

Upshift from the First Gear to the Second Gear:

The first motor controller 4 of the first drive assembly 101 controls the speed and the acceleration of the motor 1 according to the opening of the accelerator pedal sensor 8 and the pedal acceleration. When the speed of the first motor 1 of the first drive assembly 101 is transmitted to the rear wheel 92 via the first automatic transmission 2 of the first drive assembly 101 and via the differential 31 of the first drive assembly 101 and make the vehicle speed reach a threshold for shifting to the second gear, the first transmission controller 5 of the first drive assembly 101 sends a first gear-shift instruction to the first motor controller 4 of the first drive assembly 101, in which the first transmission controller 5 obtains the vehicle speed according to the speed of the differential 31 of the first drive assembly 101 detected by the output speed sensor 6 of the first drive assembly 101. After receiving the first gear-shift instruction, the first motor controller 4 of the first drive assembly 101 controls the first motor 1 of the first drive assembly 101 to cut off torque and to rotate with the first automatic transmission 2 of the first drive assembly 101, and sends an instruction to the first transmission controller 5 of the first drive assembly 101. The first transmission controller 5 of the first drive assembly 101 sends an instruction to the first automatic transmission 2 of the first drive assembly 101, such that the shift actuating cylinder 278 of the first drive assembly 101 monitors and pushes the fork rod 273 of the first drive assembly 101 via the displacement sensor 271 of the first drive assembly 101 to move rightwards, the fork 275 connected on the fork rod 273 of the first drive assembly 101 drives the synchronizer 261 of the first drive assembly 101 to and remain at the middle/neutral position. The first transmission controller 5 of the first drive assembly 101 sends an instruction to the first motor controller 4 of the first drive assembly 101, and the first motor controller 4 of the first drive assembly 101 controls the speed of the first motor 1 of the first drive assembly 101 in a way such that the speed of the driven gear 2b of the first drive assembly 101 gets close to the speed of the fifth shaft 25 of the first drive assembly 101. When the first transmission controller 5 of the first drive assembly 101 obtains the speed difference between the speed of the driven gear 2b of the first drive assembly 101 and the speed of the fifth shaft 25 of the first drive assembly 101 according to the speed measured by the output speed sensor 6 and the input speed sensor 7 of the first drive assembly 101 and the speed difference is less than 50 r/min, the first transmission controller 5 of the first drive assembly 101 sends an instruction such that the shift actuating cylinder 278 of the first drive assembly 101 monitors and pushes the fork rod 274 of the first drive assembly 101 via the displacement sensor 272 of the first drive assembly 101 to move rightwards, and the fork 276 connected to the fork rod 274 of the first drive assembly 101 drives the synchronizer 262 of the first drive assembly 101 to the second gear position, and moreover, the first transmission controller 5 of the first drive assembly 101 sends an instruction to the first motor controller 4 of the first drive assembly 101. The first motor controller 4 of the first drive assembly 101 controls the first motor 1 of the first drive assembly 101 to increase torque, and sends an instruction to the first motor controller 4 and the first transmission controller 5 of the second drive assembly 102 for notifying that the first drive assembly 101 is shifted to the second gear.

Subsequently, the second transmission controller 5000 of the second drive assembly 102 obtains the vehicle speed according to the speed of the differential 31 of the second drive assembly 102 measured by the second output speed sensor of the second drive assembly 102, and sends a second gear-shift instruction to the second motor controller 4000 of the second drive assembly 102. The second motor controller 4000 of the second drive assembly 102 controls the motor 1 of the second drive assembly 102 to cut off torque and to rotate with the second automatic transmission 2000 of the second drive assembly 102, and sends an instruction to the second transmission controller 5000 of the second drive assembly 102. The second transmission controller 5000 of the second drive assembly 102 sends an instruction to the second automatic transmission 2000 of the second drive assembly 102, such that the shift actuating cylinder 278 of the second drive assembly 102 monitors and pushes the fork rod 273 of the second drive assembly 102 via the displacement sensor 271 of the second drive assembly to move rightwards, and the fork 275 connected to the fork rod 273 of the second drive assembly 102 drives the synchronizer 261 to move to and to remain at the middle/neutral gear position. The second transmission controller 5000 of the second drive assembly 102 sends an instruction to the second motor controller 4000 of the second drive assembly 102, and the second motor controller 4000 of the second drive assembly 102 controls the speed of the second motor 1000 of the second drive assembly 102 in a way such that the speed of the driven gear 2b of the second drive assembly 102 gets close to the speed of the fifth shaft 25 of the second drive assembly 102. When the second transmission controller 5000 of the second drive assembly 102 obtains the speed difference between the speed of the driven gear 2b of the second drive assembly 102 and the speed of the fifth shaft 25 of the second drive assembly according to the speed measured by the second output speed sensor and the second input speed sensor of the second drive assembly 102 and the speed difference is less than 50 r/min, the second transmission controller 5000 of the second drive assembly 102 sends an instruction such that the shift actuating cylinder 278 of the second drive assembly 102 monitors and pushes the fork rod 274 of the second drive assembly 102 via the displacement sensor 272 of the second drive assembly 102 to move rightwards, and the fork 276 connected on the fork rod 274 of the second drive assembly 102 drives the synchronizer 262 of the second drive assembly 102 to move to the second gear position. Moreover, the second transmission controller 5000 of the second drive assembly 102 sends an instruction to the second motor controller 4000 of the second drive assembly 102. The second motor controller 4000 of the second drive assembly 102 controls the second motor 1000 of the second drive assembly 102 to increase torque. Thus, the second drive assembly 102 is shifted to the second gear.

Upshift from the Second Gear to the Third Gear:

The first motor controller 4 of the first drive assembly 101 controls the speed and the acceleration of the first motor 1 according to the opening of the accelerator pedal sensor 8 and the pedal acceleration. When the speed of the first motor 1 of the first drive assembly 101 is transmitted to the rear wheel 92 via the first automatic transmission 2 of the first drive assembly 101 and via the differential 31 of the first drive assembly 101 and make the vehicle speed reach a threshold for shifting to the third gear, the first transmission controller 5 of the first drive assembly 101 sends a first gear-shift instruction to the first motor controller 4 of the first drive assembly 101, in which the first transmission controller 5 obtains the vehicle speed according to the speed of the differential 31 of the first drive assembly 101 detected by the output speed sensor 6 of the first drive assembly 101. After receiving the first gear-shift instruction, the first motor controller 4 of the first drive assembly 101 controls the first motor 1 of the first drive assembly 101 to cut off torque and to rotate with the first automatic transmission 2 of the first drive assembly 101, and sends an instruction to the first transmission controller 5 of the first drive assembly 101. The first transmission controller 5 of the first drive assembly 101 sends an instruction to the first automatic transmission 2 of the first drive assembly 101, such that the shift actuating cylinder 278 of the first drive assembly 101 monitors and pushes the fork rod 274 of the first drive assembly 101 via the displacement sensor 272 of the first drive assembly 101 to move leftwards, the fork 276 connected on the fork rod 274 of the first drive assembly 101 drive the synchronizer 262 of the first drive assembly 101 to move to and to remain at the middle/neutral position. The first transmission controller 5 of the first drive assembly 101 sends an instruction to the first motor controller 4 of the first drive assembly 101, and the first motor controller 4 of the first drive assembly 101 controls the speed of the first motor 1 of the first drive assembly 101 in a way such that the speed of the driven gear 3b of the first drive assembly 101 gets close to the speed of the fifth shaft 25 of the first drive assembly 101. When the first transmission controller 5 of the first drive assembly 101 obtains the speed difference between the speed of the driven gear 3b of the first drive assembly 101 and the speed of the fifth shaft 25 of the first drive assembly 101 according to the speed measured by the first output speed sensor 6 and the first input speed sensor 7 of the first drive assembly 101 and the speed difference is less than 50 r/min, the first transmission controller 5 of the first drive assembly 101 sends an instruction such that the shift actuating cylinder 278 of the first drive assembly 101 monitors and pushes the fork rod 274 of the first drive assembly 101 via the displacement sensor 272 of the first drive assembly 101 to move leftwards, and the fork 276 connected to the fork rod 274 of the first drive assembly 101 moves the synchronizer 262 of the first drive assembly 101 to the third gear position, and moreover, the first transmission controller 5 of the first drive assembly 101 sends an instruction to the motor controller 4 of the first drive assembly 101. The first motor controller 4 of the first drive assembly 101 controls the first motor 1 of the first drive assembly 101 to increase torque, and sends an instruction to the first motor controller 4 and the first transmission controller 5 of the second drive assembly 102 for notifying that the first drive assembly 101 is shifted to the third gear.

Subsequently, the second transmission controller 5000 of the second drive assembly 102 obtains the vehicle speed according to the speed of the differential 31 of the second drive assembly 102 measured by the second output speed sensor of the second drive assembly 102, and sends a second gear-shift instruction to the second motor controller 4000 of the second drive assembly 102. The second motor controller 4000 of the second drive assembly 102 controls the motor 1 of the second drive assembly 102 to cut off torque and to rotate with the second automatic transmission 2000 of the second drive assembly 102, and sends an instruction to the second transmission controller 5000 of the second drive assembly 102. The second transmission controller 5000 of the second drive assembly 102 sends an instruction to the second automatic transmission 2000 of the second drive assembly 102, such that the shift actuating cylinder 278 of the second drive assembly 102 monitors and pushes the fork rod 274 of the second drive assembly 102 via the displacement sensor 272 of the second drive assembly to move leftwards, and the fork 276 connected to the fork rod 274 of the second drive assembly 102 moves the synchronizer 262 to and remain at the middle/neutral gear position. The second transmission controller 5000 of the second drive assembly 102 sends an instruction to the second motor controller 4000 of the second drive assembly 102, and the motor controller 4 of the second drive assembly 102 controls the speed of the second motor 1000 of the second drive assembly 102 in a way such that the speed of the driven gear 3b of the second drive assembly 102 gets close to the speed of the fifth shaft 25 of the second drive assembly 102. When the second transmission controller 5000 of the second drive assembly 102 obtains the speed difference between the speed of the driven gear 3b of the second drive assembly 102 and the speed of the fifth shaft 25 of the second drive assembly according to the speed measured by the second output speed sensor and the second input speed sensor of the second drive assembly 102 and the speed difference is less than 50 r/min, the second transmission controller 5000 of the second drive assembly 102 sends an instruction such that the shift actuating cylinder 278 of the second drive assembly 102 monitors and pushes the fork rod 274 of the second drive assembly 102 via the displacement sensor 272 of the second drive assembly 102 to move leftwards, and the fork 276 connected on the fork rod 274 of the second drive assembly 102 moves the synchronizer 262 of the second drive assembly 102 to the third gear position. Moreover, the second transmission controller 5000 of the second drive assembly 102 sends an instruction to the motor controller 4 of the second drive assembly 102. The second motor controller 4000 of the second drive assembly 102 controls the second motor 1000 of the second drive assembly 102 to increase torque. Thus, the second drive assembly 102 is shifted to the third gear.

Upshift from the Third Gear to the Fourth Gear:

The first motor controller 4 of the first drive assembly 101 controls the speed and the acceleration of the motor 1 according to the opening of the accelerator pedal sensor 8 and the pedal acceleration. When the speed of the first motor 1 of the first drive assembly 101 is transmitted to the rear wheel 92 via the first automatic transmission 2 of the first drive assembly 101 and via the differential 31 of the first drive assembly 101 and make the vehicle speed reach a threshold for shifting to the fourth gear, the first transmission controller 5 of the first drive assembly 101 sends a first gear-shift instruction to the first motor controller 4 of the first drive assembly 101, in which the first transmission controller 5 obtains the vehicle speed according to the speed of the differential 31 of the first drive assembly 101 detected by the first output speed sensor 6 of the first drive assembly 101. After receiving the first gear-shift instruction, the first motor controller 4 of the first drive assembly 101 controls the first motor 1 of the first drive assembly 101 to cut off torque and to rotate with the first automatic transmission 2 of the first drive assembly 101, and sends an instruction to the first transmission controller 5 of the first drive assembly 101. The first transmission controller 5 of the first drive assembly 101 sends an instruction to the first automatic transmission 2 of the first drive assembly 101, such that the shift actuating cylinder 278 of the first drive assembly 101 monitors and pushes the fork rod 274 of the first drive assembly 101 via the displacement sensor 272 of the first drive assembly 101 to move rightwards, the fork 276 connected on the fork rod 274 of the first drive assembly 101 moves the synchronizer 262 of the first drive assembly 101 to and remain at the middle/neutral position. The first transmission controller 5 of the first drive assembly 101 sends an instruction to the first motor controller 4 of the first drive assembly 101, and the first motor controller 4 of the first drive assembly 101 controls the speed of the first motor 1 of the first drive assembly 101 in a way such that the speed of the third shaft 23 of the first drive assembly 101 gets close to the speed of the fifth shaft 25 of the first drive assembly 101. When the first transmission controller 5 of the first drive assembly 101 obtains the speed difference between the speed of the third shaft 23 of the first drive assembly 101 and the speed of the fifth shaft 25 of the first drive assembly 101 according to the speed measured by the first output speed sensor 6 and the first input speed sensor 7 of the first drive assembly 101 and the speed difference is less than 50 r/min, the first transmission controller 5 of the first drive assembly 101 sends an instruction such that the shift actuating cylinder 278 of the first drive assembly 101 monitors and pushes the fork rod 273 of the first drive assembly 101 via the displacement sensor 271 of the first drive assembly 101 to move rightwards, and the fork 275 connected to the fork rod 273 of the first drive assembly 101 moves the synchronizer 261 of the first drive assembly 101 to the fourth gear position, for making the third shaft 23 and the fifth shaft 25 rotate coaxially. Moreover, the first transmission controller 5 of the first drive assembly 101 sends an instruction to the first motor controller 4 of the first drive assembly 101. The first motor controller 4 of the first drive assembly 101 controls the motor 1 of the first drive assembly 101 to increase torque, and sends an instruction to the first motor controller 4 and the first transmission controller 5 of the second drive assembly 102 for notifying that the first drive assembly 101 is shifted to the fourth gear.

Subsequently, the second transmission controller 5000 of the second drive assembly 102 obtains the vehicle speed according to the speed of the differential 31 of the second drive assembly 102 measured by the second output speed sensor of the second drive assembly 102, and sends a second gear-shift instruction to the second motor controller 4000 of the second drive assembly 102. The second motor controller 4000 of the second drive assembly 102 controls the second motor 1000 of the second drive assembly 102 to cut off torque and to rotate with the second automatic transmission 2000 of the second drive assembly 102, and sends an instruction to the second transmission controller 5000 of the second drive assembly 102. The second transmission controller 5000 of the second drive assembly 102 sends an instruction to the second automatic transmission 2000 of the second drive assembly 102, such that the shift actuating cylinder 278 of the second drive assembly 102 monitors and pushes the fork rod 274 of the second drive assembly 102 via the displacement sensor 272 of the second drive assembly to move rightwards, and the fork 276 connected to the fork rod 274 of the second drive assembly 102 moves the synchronizer 262 to and remain at the middle/neutral gear position. The second transmission controller 5000 of the second drive assembly 102 sends an instruction to the motor controller 4 of the second drive assembly 102, and the second motor controller 4000 of the second drive assembly 102 controls the speed of the motor 1 of the second drive assembly 102 in a way such that the speed of the third shaft 23 of the second drive assembly 102 gets close to the speed of the fifth shaft 25 of the second drive assembly 102. When the second transmission controller 5000 of the second drive assembly 102 obtains the speed difference between the speed of the third shaft 23 of the second drive assembly 102 and the speed of the fifth shaft 25 of the second drive assembly according to the speed measured by the second output speed sensor and the second input speed sensor of the second drive assembly 102 and the speed difference is less than 50 r/min, the second transmission controller 5000 of the second drive assembly 102 sends an instruction such that the shift actuating cylinder 278 of the second drive assembly 102 monitors and pushes the fork rod 273 of the second drive assembly 102 via the displacement sensor 271 of the second drive assembly 102 to move rightwards, and the fork 275 connected on the fork rod 273 of the second drive assembly 102 moves the synchronizer 261 of the second drive assembly 102 to the fourth gear position, for making the third shaft 23 and the fifth shaft 25 rotate coaxially. Moreover, the second transmission controller 5000 of the second drive assembly 102 sends an instruction to the second motor controller 4000 of the second drive assembly 102. The second motor controller 4000 of the second drive assembly 102 controls the second motor 1000 of the second drive assembly 102 to increase torque. Thus, the second drive assembly 102 is shifted to the fourth gear.

Those skilled in the art may derive the alternate downshift process, the skip upshift process and the skip downshift process from the above alternate upshift process, and thus the detailed description will be omitted herein.

FIGS. 3-4 only illustrate a specific example of the first automatic transmission 2, which does not limit the structure of the automatic transmission of the present disclosure. The number of gears of the first automatic transmission 2 may be two or more than two, and there may be two or more than two first drive assemblies 101 and/or two or more than two second drive assemblies 102.

Embodiments of the present disclosure also provide a gear-shift control method for the power transmission system of the vehicle.

Figure 5:
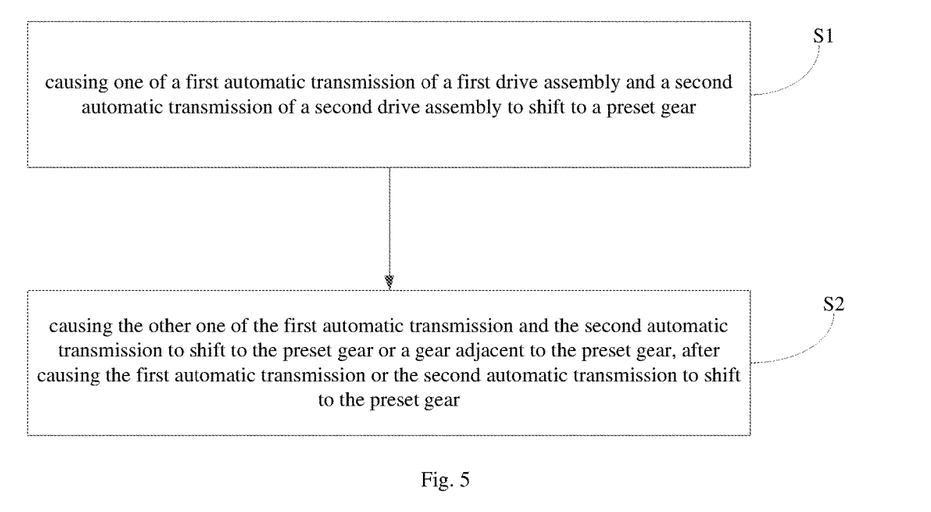
FIG. 5 is a flow chart of a gear-shift control method for a power transmission system of a vehicle according to an embodiment of the present disclosure.

FIG. 5 is a flow chart of a gear-shift control method for a power transmission system of a vehicle according to an embodiment of the present disclosure. As shown in FIG. 5, the method includes following steps.

In step S1, one of the first automatic transmission and the second automatic transmission is caused to shift to the preset gear.

In step S2, the other one of the first automatic transmission and the second automatic transmission is caused to shift to the preset gear or the gear adjacent to the preset gear, after the first automatic transmission or the second automatic transmission is caused to shift to the preset gear.

With the gear-shift control method according to embodiments of the present disclosure, it may realize the alternate shift or skip shift of the first automatic transmission and the second automatic transmission, thus realizing drive without power interruption, and shortening the acceleration process and the deceleration process of the vehicle.

In the following, illustration will be made in an example in which the second automatic transmission is caused to shift to the preset gear or the gear adjacent to the preset gear after the first automatic transmission is caused to shift to the preset gear.

With respect to the above described power transmission system, the first transmission controller obtains the vehicle speed according to the output speed detected by the first output speed sensor, and when the vehicle speed reaches the first preset vehicle speed value corresponding to the preset gear, the first transmission controller sends a first gear-shift instruction to the first motor controller.

In an embodiment, the first motor controller may control the speed and the acceleration of the first motor according to the opening of the accelerator pedal sensor and the acceleration of the accelerator pedal of the vehicle. The speed of the first motor is transferred to the first drive axle via the first automatic transmission, and the first drive axle transfers the speed to the wheel via the differential thereof. The first output speed sensor detects the speed of the first drive axle, and the first transmission controller obtains the vehicle speed according to the speed detected by the first output speed sensor and sends the first gear-shift instruction to the first motor controller when the vehicle speed reaches the first preset vehicle speed value.

The first motor controller controls the first motor to cut off torque and to rotate with the first automatic transmission according to the first gear-shift instruction, and sends a signal to the first transmission controller for controlling the first automatic transmission to shift to the preset gear. The first transmission controller sends a signal to the first motor controller after the gear-shift of the first drive assembly is completed.

In an embodiment, the first motor controller controls the first motor to cut off torque and to rotate with the first automatic transmission, and sends a first neutral gear instruction to the first transmission controller. The first transmission controller controls the first automatic transmission to shift to and remain at the neutral gear according to the first neutral gear instruction, and meanwhile sends an output speed control signal to the first motor controller. More specifically, the first transmission controller controls the shift actuator of the first automatic transmission to shift to the neutral gear according to the detecting value of the first displacement sensor.

The first motor controller controls the speed of the first motor according to the output speed control signal. When the speed difference between the speed of the shifting gear for the preset gear of the first automatic transmission and the output speed of the first automatic transmission is less than the first preset value, the first automatic transmission is shifted to the preset gear from the neutral gear, and the first transmission controller sends a first torque increasing instruction to the first motor controller.

In an embodiment, the first transmission controller controls the shift actuator of the first automatic transmission to shift to the preset gear from the neutral gear according to the detecting value of the first displacement sensor.

Further, the first transmission controller obtains the output speed of the first automatic transmission according to the output speed detected by the first output speed sensor, for example, the speed of the fifth shaft shown in the specific example of FIG. 3.

The first transmission controller obtains the speed of the shifting gear for the preset gear of the first automatic transmission according to the input speed detected by the first input speed sensor, for example, the speed of the driven gear, the driven gear or the driven gear fit over the fifth shaft, or the speed of the third shaft shown in the specific example of FIG. 3, in which the gear fit over the shaft can rotate relative to the shaft, and can also rotate synchronously with the shaft via elements such as the synchronizer or the joint sleeve.

It should be understood that, the speed of the input end of the automatic transmission is transferred as the speed of the shifting gear for the preset gear via the transfer group, and thus the speed of the shifting gear for the preset gear can be obtained according to the transmission ratio of the transfer group.

In an advantageous embodiment, the first preset value may be less than or equal to 50 r/min, and thus the gear-shift may be more stable. Certainly, the first preset value may be determined according to the structure of the automatic transmission and the design demand of the whole vehicle, and for the sake of reducing control difficulty and manufacture cost, the first preset value may be less than or equal to 100 r/min.

After the first automatic transmission is shifted to the preset gear, the first motor controller controls the first motor to increase torque, and the gear-shift of the first drive assembly is completed.

Further, when the second motor controller and the second transmission controller receive the gear-shift ending signal of the first drive assembly, and the vehicle speed reaches the first preset vehicle speed value or the second preset vehicle speed value corresponding to the gear adjacent to the preset gear, the second transmission controller sends a second gear-shift instruction to the second motor controller.

In an embodiment, the second motor controller controls the speed and the acceleration of the second motor according to the opening of the accelerator pedal sensor and the acceleration of the accelerator pedal. The speed of the second motor is transferred to the second drive axle via the second automatic transmission, and the second drive axle transfers the speed to the wheel via the differential thereof. The second output speed sensor detects the speed of the second drive axle, and the second transmission controllers obtains the vehicle speed according to the speed of the second drive axle detected by the second output speed sensor. When the first drive assembly completes the gear-shift and sends a signal to the second motor controller and the second transmission controller, and the vehicle speed reaches the first preset vehicle speed value or the second preset vehicle speed value, the second transmission controller sends a second gear-shift instruction to the second motor controller.

In other words, the second drive assembly does not start gear-shift until the first drive assembly completes the gear-shift. Further, there are two conditions required by the second drive assembly for gear-shift, one is the first drive assembly completing the gear-shift, and the other one is the vehicle speed reaching the first preset vehicle speed value or the second preset vehicle speed value of the second drive assembly.

The second motor controller controls the second motor to cut off torque and to rotate with the second automatic transmission according to the second gear-shift instruction, and sends a signal to the second transmission controller, such that the second transmission controller controls the second automatic transmission to shift to the preset gear and sends the second torque increasing instruction to the second motor controller, or the second transmission controller controls the second automatic transmission to shift to the gear adjacent to the preset gear and sends the second torque increasing instruction to the second motor controller.

The preset gear herein is the gear same as the preset gear which the first drive assembly wants to achieve, and the gear adjacent to the preset gear may be the gear higher than the preset gear or lower than the preset gear.

In an embodiment, the second motor controller controls the second motor to cut off torque and to rotate with the second transmission controller, and sends a second neutral gear instruction to the second transmission controller. The second transmission controller controls the second automatic transmission to shift to and remain at the neutral gear, and outputs a speed control signal to the second motor controller. Specifically, the second transmission controller controls the shift actuator of the second automatic transmission to shift to the neutral gear according to the detecting value of the second displacement sensor.

The second motor controller obtains the speed of the second motor according to the speed control signal. For the alternate shift of the first drive assembly and the second drive assembly, the second motor controller controls the second automatic transmission to shift to the preset gear from the neutral gear and sends a second torque increasing instruction to the second motor controller when the speed difference between the speed of the shifting gear for the preset gear of the second automatic transmission and the output speed of the second automatic transmission is less than the second preset value.

For the skip shift of the first drive assembly and the second drive assembly, the second transmission controller controls the second automatic transmission to shift to the gear adjacent to the preset gear from the neutral gear and sends the second torque increasing instruction to the second motor controller when the speed difference between the speed of the shifting gear for the gear adjacent to the preset gear of the second automatic transmission and the output speed of the second automatic transmission is less than the second preset value.

In an embodiment, the second transmission controller controls the shift actuator of the second automatic transmission to shift to the preset gear or the gear adjacent to the preset gear from the neutral gear according to the detecting value of the second displacement sensor.

Further, the second transmission controller obtains the output speed of the second automatic transmission according to the output speed detected by the second output speed sensor, for example the speed of the fifth shaft shown in the specific example of FIG. 3.

For the alternate shift of the first drive assembly and second drive assembly, the second transmission controller may obtain the speed of the shifting gear for the preset gear of the second automatic transmission according to the input speed detected by the second input speed sensor, for example the speed of the driven gear $1b$, the driven gear or the driven gear fit over the fifth shaft, or the speed of the third shaft shown in the specific example of FIG. 3.

For the skip shift of the first drive assembly and the second drive assembly, the second transmission controller may obtain the speed of the shifting gear for the gear adjacent to the preset gear according to the input speed detected by the second input speed sensor.

In an advantageous embodiment, the second preset value may be less than or equal to 50 r/min, and thus, the gear-shift may be more stable. Certainly, the second preset value may be determined according to the structure of the automatic transmission and the design demand of the whole vehicle, and for the sake of reducing control difficulty and manufacture cost, the second preset value may be less than or equal to 100 r/min.

After the second automatic transmission is shifted to the preset gear or the gear adjacent to the preset gear, the second motor controller controls the second motor to increase torque, and the gear-shift of the second drive assembly is completed.

In conclusion, according to the the gear-shift control method for the power transmission system of the present disclosure, the first drive assembly or the second drive assembly may drive the vehicle by itself, and with the combination of the first drive assembly and the second drive assembly, the skip shift or the alternate shift of the first drive assembly and the second drive assembly may be realized, which has a wide range of application, and can realize drive process without power interruption, thus shortening the acceleration process and the deceleration process of the vehicle.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A power transmission system of a vehicle, comprising:
a first drive assembly comprising a first motor and a first automatic transmission, wherein the first motor is connected with the first automatic transmission for outputting power to two wheels of the vehicle; and
a second drive assembly comprising a second motor and a second automatic transmission, wherein the second motor is connected with the second automatic transmission for outputting power to the other two wheels of the vehicle,
wherein the first automatic transmission and the second automatic transmission are configured to be shifted to a preset gear or a gear adjacent to the preset gear, such that when one of the first automatic transmission and the second automatic transmission is shifted to the preset gear, the other one of the first automatic transmission and the second automatic transmission is shifted to the preset gear or the gear adjacent to the preset gear.

2. The system according to claim 1, wherein
the first drive assembly further comprises a first motor controller and a first transmission controller, and the second drive assembly further comprises a second motor controller and a second transmission controller;
the first motor controller is connected with the first motor and an accelerator pedal sensor respectively, and is configured to control a speed and an acceleration of the first motor according to an opening of the accelerator pedal sensor and an acceleration of an accelerator pedal of the vehicle;
the second motor controller is connected with the second motor and the accelerator pedal sensor respectively, and is configured to control a speed and an acceleration of the second motor according to the opening of the accelerator pedal sensor and the acceleration of the accelerator pedal of the vehicle;
the first transmission controller is connected with the first automatic transmission, and the first transmission controller communicates with the first motor controller for controlling the first automatic transmission to shift gears;
the second transmission controller is connected with the second automatic transmission, and the second transmission controller communicates with the second motor controller for controlling the second automatic transmission to shift gears;
the first motor controller is configured to communicate with the second motor controller, the first transmission controller is configured to communicate with the second motor controller, and the second transmission controller is configured to communicate with the first motor controller, such that the second transmission controller is configured to control the second automatic transmission to shift to the preset gear or the gear adjacent to the preset gear after the first transmission controller is configured to control the first automatic transmission to shift to the preset gear, or the first transmission controller is configured to control the first automatic transmission to shift to the preset gear or the gear adjacent to the preset gear after the second transmission controller is configured to control the second automatic transmission to shift to the preset gear.

3. The system according to claim 1, wherein
the first drive assembly further comprises a first drive axle and a first output speed sensor, the first automatic transmission is connected with a first portion of wheels of the vehicle via the first drive axle, and the first output speed sensor is connected with the first drive axle and configured to detect an output speed of the first drive axle;
the second drive assembly further comprises a second drive axle and a second output speed sensor, the second automatic transmission is connected with a second portion of wheels of the vehicle via the second drive axle, and the second output speed sensor is connected with the second drive axle and configured to detect an output speed of the second drive axle.

4. The system according to claim 1, wherein
the first drive assembly further comprises a first input speed sensor connected with an output end of the first motor or an input end of the first automatic transmission and configured to detect a speed of the output end of the first motor or a speed of the input end of the first automatic transmission; and
the second drive assembly further comprises a second input speed sensor connected with an output end of the second motor or an input end of the second automatic transmission and configured to detect a speed of the output end of the second motor or a speed of the input end of the second automatic transmission.

5. The system according to claim 1, wherein
the first automatic transmission comprises a first shift actuator and a first displacement sensor, the first displacement sensor is connected with the first transmission controller and the first shift actuator respectively, and the first transmission controller is configured to control the first shift actuator to move according to a detecting value of the first displacement sensor for completing gear-shift; and
the second automatic transmission comprises a second shift actuator and a second displacement sensor, the second displacement sensor is connected with the second transmission controller and the second shift actuator respectively, and the second transmission controller is configured to control the second shift actuator to move according to a detecting value of the second displacement sensor for completing gear-shift.

6. The system according to claim 2, wherein
the first transmission controller is configured to obtain a vehicle speed according to an output speed detected by a first output speed sensor, and to send a first gear-shift instruction to the first motor controller when a vehicle speed reaches a first preset vehicle speed value corresponding to the preset gear;
the first motor controller is configured to control the first motor to cut off torque and to rotate with the first automatic transmission according to a first gear-shift instruction, and to send a first control signal to the first transmission controller, such that the first transmission controller is configured to control the first automatic transmission to shift to the preset gear;
the first transmission controller is further configured to send a first torque increasing instruction to the first motor controller after the first automatic transmission is shifted to the preset gear, such that the first controller is configured to control the first motor to increase torque according to the first torque increasing instruction.

7. The system according to claim 6, wherein the first transmission controller is configured to control the first automatic transmission to shift to and remain at a neutral gear according to the first control signal, and to output a first speed control signal to the first motor controller for controlling the speed of the first motor, in which, the first transmission controller is configured to control the first automatic transmission to shift to the preset gear from the neutral gear when a first speed difference between a speed of a shifting gear for the preset gear of the first automatic transmission and an output speed of the first automatic transmission is less than a first preset value.

8. The system according to claim 7, wherein the first transmission controller is configured to obtain the output speed of the first automatic transmission according to the output speed detected by the first output speed sensor, and to obtain the speed of the shifting gear for the preset gear of the first automatic transmission according to the input speed detected by the first input speed sensor.

9. The system according to claim 2, wherein
the second transmission controller is configured to send a second gear-shift instruction to the second motor controller when receiving a gear-shift ending signal sent by the first motor controller and a vehicle speed reaches a first preset vehicle speed value or a second preset vehicle speed value corresponding to the gear adjacent to the preset gear;
the second motor controller is configured to control the second motor to cut off torque and to rotate with the second automatic transmission according to a second gear-shift instruction, and to send a second control signal to the second transmission controller, such that the second transmission controller is configured to control the second automatic transmission to shift to the preset gear or the gear adjacent to the preset gear;
the second transmission controller is further configured to send a second torque increasing instruction to the second motor controller when the second automatic transmission is shifted to the preset gear or the gear adjacent to the preset gear, such that the second motor controller is configured to control the second motor to increase torque according to the second torque increasing instruction.

10. The system according to claim 9, wherein the second transmission controller is configured to control the second automatic transmission to shift to and remain at the neutral gear according to the second control signal, and to output a second speed control signal to the second motor controller, in which, the second transmission controller is configured to control the second automatic transmission to shift to the preset gear from the neutral gear when a second speed difference between a speed of the shifting gear for the preset gear of the second automatic transmission and the output speed of the second automatic transmission is less than a second preset value; the second transmission controller is configured to control the second automatic transmission to shift to the gear adjacent to the preset gear from the neutral gear when a third speed difference between the speed of the shifting gear for the gear adjacent to the preset gear of the second automatic transmission and the output speed of the second automatic transmission is less than the second preset value.

11. A vehicle, comprising the power transmission system according to claim 1.

12. A gear-shift control method for a power transmission system of a vehicle, comprising:
causing one of a first automatic transmission of a first drive assembly and a second automatic transmission of a second drive assembly to shift to a preset gear;
causing the other one of the first automatic transmission and the second automatic transmission to shift to the preset gear or a gear adjacent to the preset gear after causing the first automatic transmission or the second automatic transmission to shift to the preset gear.

13. The method according to claim 12, wherein the step of causing one of a first automatic transmission of a first drive assembly and a second automatic transmission of a second drive assembly to shift to a preset gear comprises:
detecting a vehicle speed;

causing a first motor of the first drive assembly to cut off torque and to rotate with the first automatic transmission, when vehicle speed reaches a first preset vehicle speed value corresponding to the preset gear;

causing the first automatic transmission to shift to the preset gear; and causing the first motor to increase torque after the first automatic transmission is shifted to the preset gear.

14. The method according to claim 13, wherein the step of detecting a vehicle speed comprises:

adjusting a speed and an acceleration of the first motor according to an opening of an accelerator pedal sensor and an acceleration of an accelerator pedal of vehicle;

detecting an output speed of a first drive axle, in which the speed of the first motor is transferred to the first drive axle via the first automatic transmission; and obtaining vehicle speed according to the output speed of the first drive axle.

15. The method according to claim 14, wherein the step of causing the first automatic transmission to shift to the preset gear comprises:

generating a first neutral gear instruction;

causing the first automatic transmission to shift to and remain at the neutral gear according to the first neutral gear instruction, and controlling the speed of the first motor; and causing the first automatic transmission to shift to the preset gear from the neutral gear when a first speed difference between a speed of a shifting gear for the preset gear of the first automatic transmission and an output speed of the first automatic transmission is less than a first preset value.

16. The method according to claim 15, further comprising:

obtaining the output speed of the first automatic transmission according to the output speed of the first drive axle;

detecting an output speed of an output end of the first motor or an input speed of an input end of the first automatic transmission; and obtaining the speed of the shifting gear for the preset gear of the first automatic transmission according to the output speed of the output end of the first motor or the input speed of the input end of the first automatic transmission.

17. The method according to claim 15, wherein the first preset value is less than or equal to 50 revolutions per minute (r/min).

18. The method according to claim 13, wherein the step of causing the other one of the first automatic transmission and the second automatic transmission to shift to the preset gear or the gear adjacent to the preset gear comprises:

causing the second motor to cut off torque and to rotate with the second automatic transmission, when a gearshift ending signal of the first automatic transmission is received and vehicle speed reaches the first preset vehicle speed value or a second preset vehicle speed value corresponding to the gear adjacent to the preset gear;

causing the second automatic transmission to shift to the preset gear or the gear adjacent to the preset gear; and causing a second motor of the second drive assembly to increase torque after the second automatic transmission is shifted to the preset gear or the gear adjacent to the preset gear.

19. The method according to claim 18, wherein the step of causing the second automatic transmission to shift to the preset gear or the gear adjacent to the preset gear comprises:

generating a second neutral gear instruction;

causing the second automatic transmission to shift to and to remain at the neutral gear according to the second neutral gear instruction, and adjusting the speed of the second motor;

causing the second automatic transmission to shift to the preset gear from the neutral gear when a second speed difference between a speed of a shifting gear for the preset gear of the second automatic transmission and an output speed of the second automatic transmission is less than a second preset value; and causing the second automatic transmission to shift to the gear adjacent to the preset gear from the neutral gear when a third speed difference between a speed of a shifting gear for the gear adjacent to the preset gear of the second automatic transmission and the output speed of the second automatic transmission is less than the second preset value.

20. The method according to claim 19, wherein the second preset value is less than or equal to 50 revolutions per minute (r/min).

* * * * *